2,885,325

PURIFICATION OF CANAIGRE TANNIN EXTRACTS

Elmer A. Weaver, Spring Mount, and Theone C. Cordon, Philadelphia, Pa., assignors to the United States of America as represented by the Secretary of Agriculture No Drawing. Application October 3, 1957
Serial No. 688,098

1 Claim. (Cl. 195—2)

(Granted under Title 35, U.S. Code (1952), sec. 266)

A non-exclusive, irrevocable, royalty-free license in the invention herein described, throughout the world for all purposes of the United States Government, with the power to grant sublicenses for such purposes, is hereby granted to the Government of the United States of America.

This application is a continuation-in-part of application filed February 7, 1956, Serial No. 564,083, now abandoned.

The object of this invention is to provide processes for reducing the amount of nontannin solids in canaigre tannin extracts, thereby improving the purity of the latter.

Canaigre extract typically has a solids analysis of about 40–50% of tannin and 50–60% of nontannins. The latter not only is useless for tanning but is a serious obstacle to many commercial uses of canaigre tannin extracts because of its bulk and its chemical and biological instability.

A large proportion of the nontannins in canaigre extract is of a carbohydrate nature, mostly sugars. Microbial fermentation is a method that has been used to remove sugars from canaigre tannin extracts. While most sugar-consuming microbes cannot grow satisfactorily in the presence of large amounts of canaigre tannin, a type of yeast known as Strain Y89, which was isolated by us and which is entered in the collection at the Northern Utilization Research and Development Division (formerly known as the Northern Utilization Research Branch and prior to that as the Northern Regional Research Laboratory) of the United States Department of Agriculture as NRRL Y–2403, has been found that can do so. This yeast, while able to live and grow (propagate) in canaigre tannin extracts and to remove a portion of the sugars present, was not able heretofore to utilize substantially all of the sugars present. Thus, extracts that had been subjected to the yeast fermentation frequently contained one-half or even more of the original amount of sugar present and no practical method for its removal was known.

NRRL Y–2403, on the basis of biochemical tests, was found to be a strain of yeast closely related to species of the genus Hansenula in the area of *Hansenula anomala*. However, Y–2403 did not mate with mating types of *H. anomala*, *H. ciferrii*, or *H. subpelliculosa*. The complete lack of sexual activity with any of these species, and its slight difference in biochemical properties from these species, suggested that it was a heterothallic species distinct from these three and of which the opposite mating type was lacking. Under these conditions, NRRL Y–2403 was considered to represent a new species tentatively to be placed in Candida if it produced hyphae or in Torulopsis if it did not. It was found to produce pseudohyphae to a limited extent although sufficient to place it in the genus Candida according to the Dutch taxonomy.

When NRRL Y–2403 was placed in Candida, it occupied a position close to *Candida pelliculosa*, the non-sporogenous form of *Hansenula anomala*, but differed therefrom by its inability to ferment maltose. It has since been determined that NRRL Y–2403 is a new variety of *Candida pelliculosa*.

The assimilation reactions of Y–2403 is identical to that of *H. anomala*. Y–2403 assimilates glucose, galactose, maltose, sucrose, cellobiose, trahalose, raffinose, melezitose, soluble starch, xylose, D-ribose, ethyl alcohol, glycerol, erythritol, adonitol, mannitol, sorbitol, alpha-methylglucoside, salacin, pyruvate, lactate, succinate, citrate, and nitrate. It does not assimilate L-sorbose, lactose, melibiose, inulin, L-arabinose, D-arabinose, rhamnose, D-glucosamine, dulcitol, potassium gluconate, calcium 2-ketogluconate, potassium 5-ketogluconate, potassium sodium saccharate, ethyl acetoacetate, or inositol. It synthesizes all the vitamins it needs. It does not synthesize starch. It grows moderately well in media of moderate osmotic pressure.

We have now discovered that the sugar remaining after canaigre tannin extract has been fermented with yeast NRRL Y–2403 consists almost entirely of sucrose. This is most unexpected because when this yeast is cultured in tannin-free media it readily consumes sucrose. This surprising observation suggests that the tannin inactivates the enzymes whereby the yeast converts sucrose to simple sugars. We have further discovered that if yeast invertase is added to the canaigre extract before or during the yeast fermentation, the yeast is then able to consume substantially all the sugars present and thereby produce a much purer tannin extract than heretofore.

According to the invention, an aqueous canaigre tannin extract is prepared, either by extracting canaigre roots with water or by dissolving in water a previously prepared extract. The aqueous extract is then inoculated with yeast NRRL Y–2403 and the fermentation conducted at the autogenous pH and in the presence of yeast invertase. The latter may be added before, simultaneously with, or after the addition of the inoculum. The fermentation is allowed to proceed substantially to completion, the yeast cells are separated from the substrate by any suitable means, such as by filtration or centrifugation, and the purified tannin is recovered from the resulting clarified aqueous substrate.

The practice of the invention is illustrated by the following example:

Comminuted canaigre roots were extracted with water to yield an aqueous canaigre tannin extract containing 3.30% tannins and 1.31% total sugars. This extract was inoculated in the conventional manner with yeast NRRL Y–2403 and at the same time 0.05% by weight of a commercial yeast invertase preparation was added. The fermentation must be conducted aerobically and required 18 hours for substantially complete removal of the sugars. Analysis then showed 3.33% tannins and 0.08% sugars. The purity of the tannin, based on soluble solids had been thus increased from 49.5% to 64.0%.

A control fermentation, in which the same inoculum was used but no enzyme was added, yielded a substrate after the fermentation containing 0.79% sugars and in which the purity of the tannin was only 55.8%. Thus it is seen that in the absence of added invertase the yeast was able to consume only about 40% of the sugars present.

Experiments similar to that described above were conducted in which the yeast invertase was replaced with fungal or bacterial amylases. While the latter showed some slight activity in promoting the assimilation of the sugars by the yeast, the effect was too small to be of practical utility.

We have found that the above process is operable in extracts containing up to about 10% total solids but that if the solids content is above that amount the yeast does not grow satisfactorily.

Other preparations and brands of yeast invertase show substantially the same activity as that used in the above described example.

We claim:

The process of purifying crude canaigre tannin comprising dissolving the crude tannin in water to form a solution containing not more than about 10% of total solids, adding to said solution an inoculum of yeast NRRL Y-2403 and yeast invertase, conducting an aerobic fermentation of the thus inoculated solution until a substantial proportion of the sugars present in the crude tannin has been consumed by the yeast, separating the yeast cells from the tannin solution and recovering the thus purified tannin solution.

References Cited in the file of this patent

UNITED STATES PATENTS 2,594,291     Cordon et al.            Apr. 29, 1952

OTHER REFERENCES

Invertase, by Neuberg et al., publ. by Sugar Research Foundation, Inc. (N.Y.), pages 9, 10, 44, 45 and 46.

J. American Leather Chemists Association, vol. XLIX, No. 1, pages 43–52.